T. J. GEE.
BAND CUTTER AND FEEDER FOR THRESHING MACHINES.
APPLICATION FILED JULY 21, 1920.
1,370,740.
Patented Mar. 8, 1921.
7 SHEETS—SHEET 3.
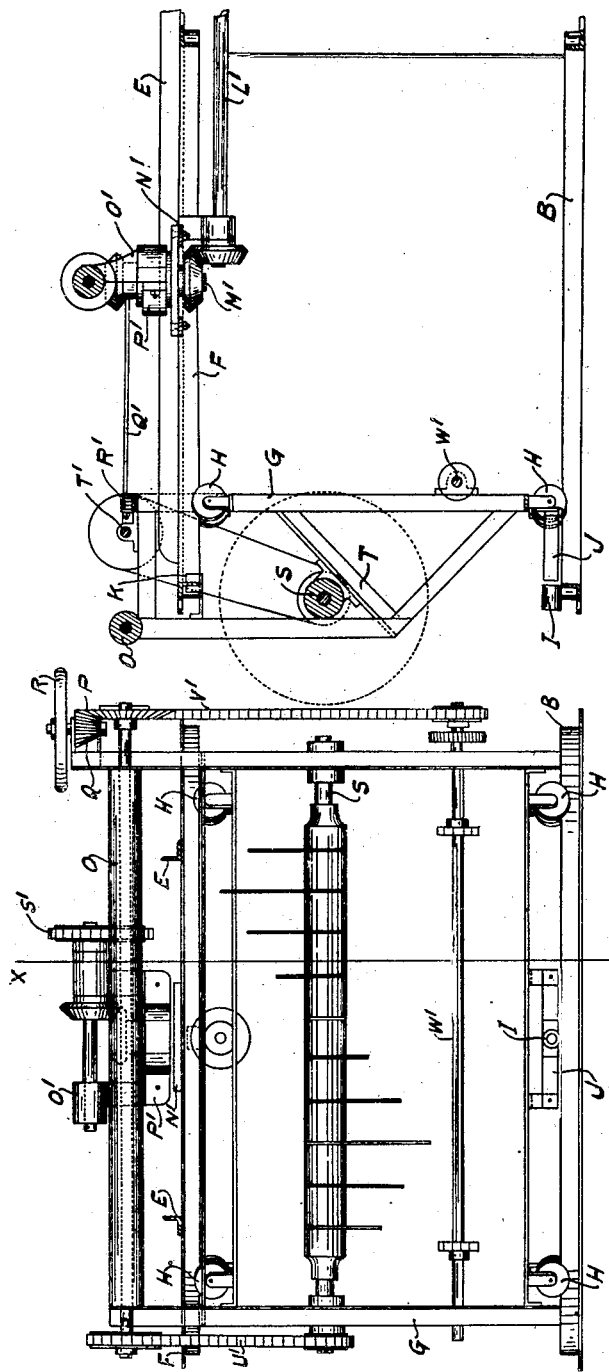
Inventor:
Thomas John Gee,
by Calvo Kalvo
Attorneys T. J. GEE.
BAND CUTTER AND FEEDER FOR THRESHING MACHINES.
APPLICATION FILED JULY 21, 1920.

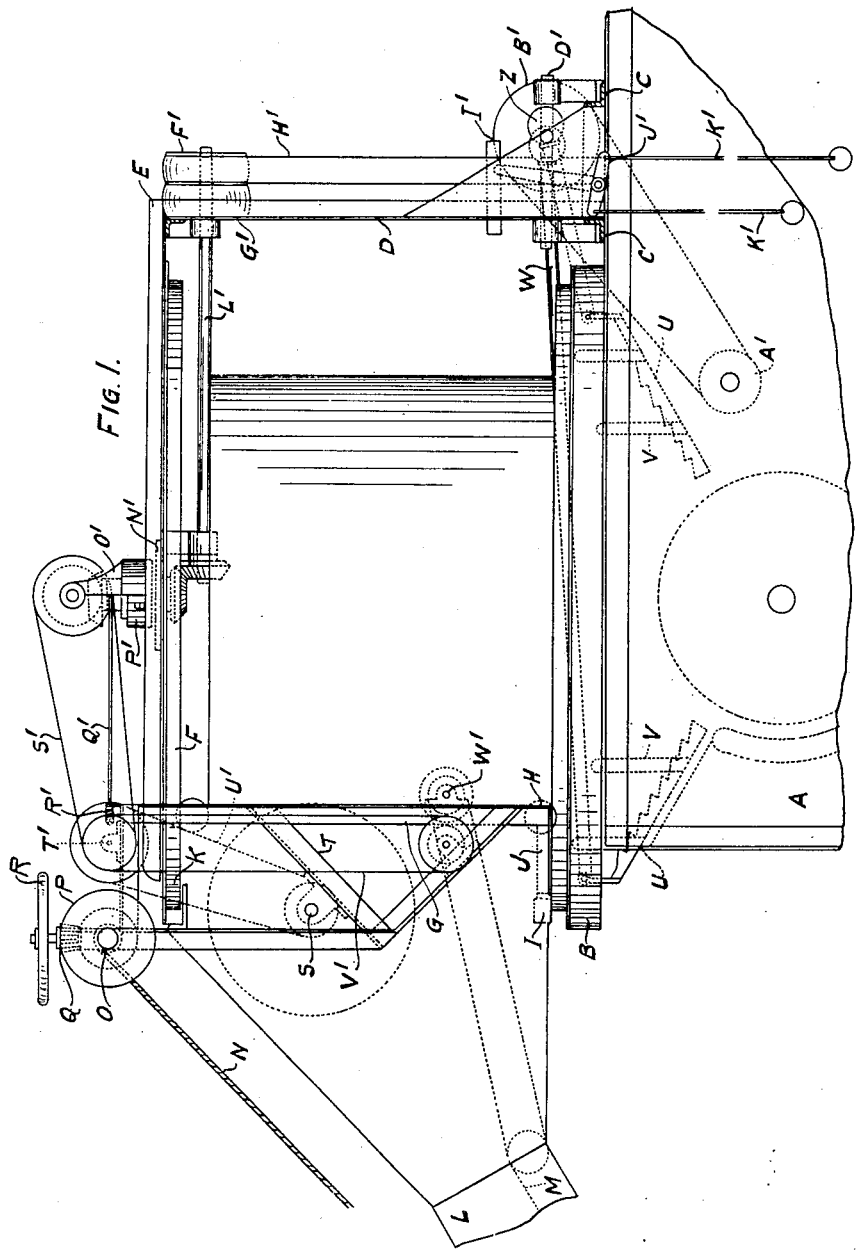

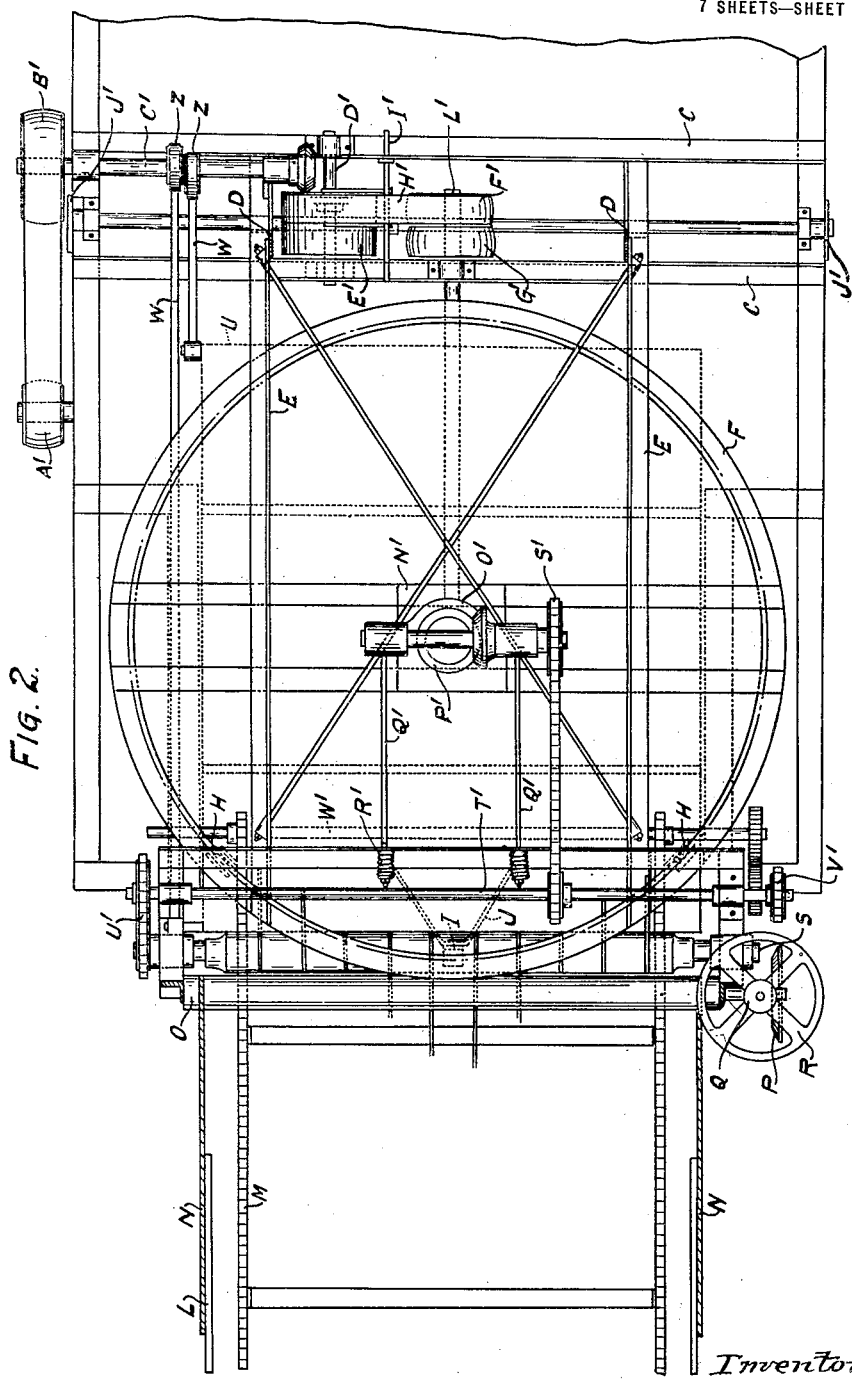

1,370,740.

Patented Mar. 8, 1921.
7 SHEETS—SHEET 4.

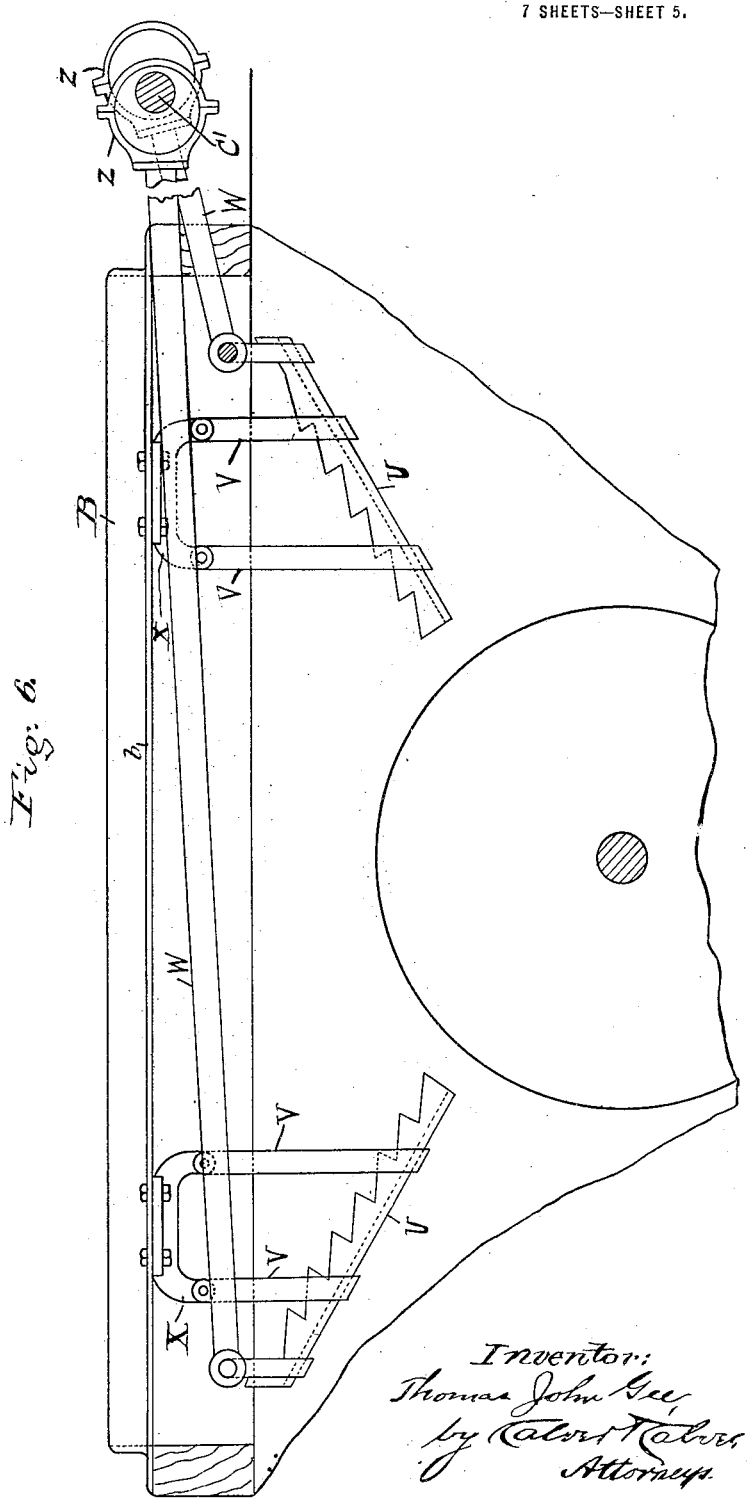

T. J. GEE.
BAND CUTTER AND FEEDER FOR THRESHING MACHINES.
APPLICATION FILED JULY 21, 1920.
1,370,740.
Patented Mar. 8, 1921.
7 SHEETS—SHEET 6.
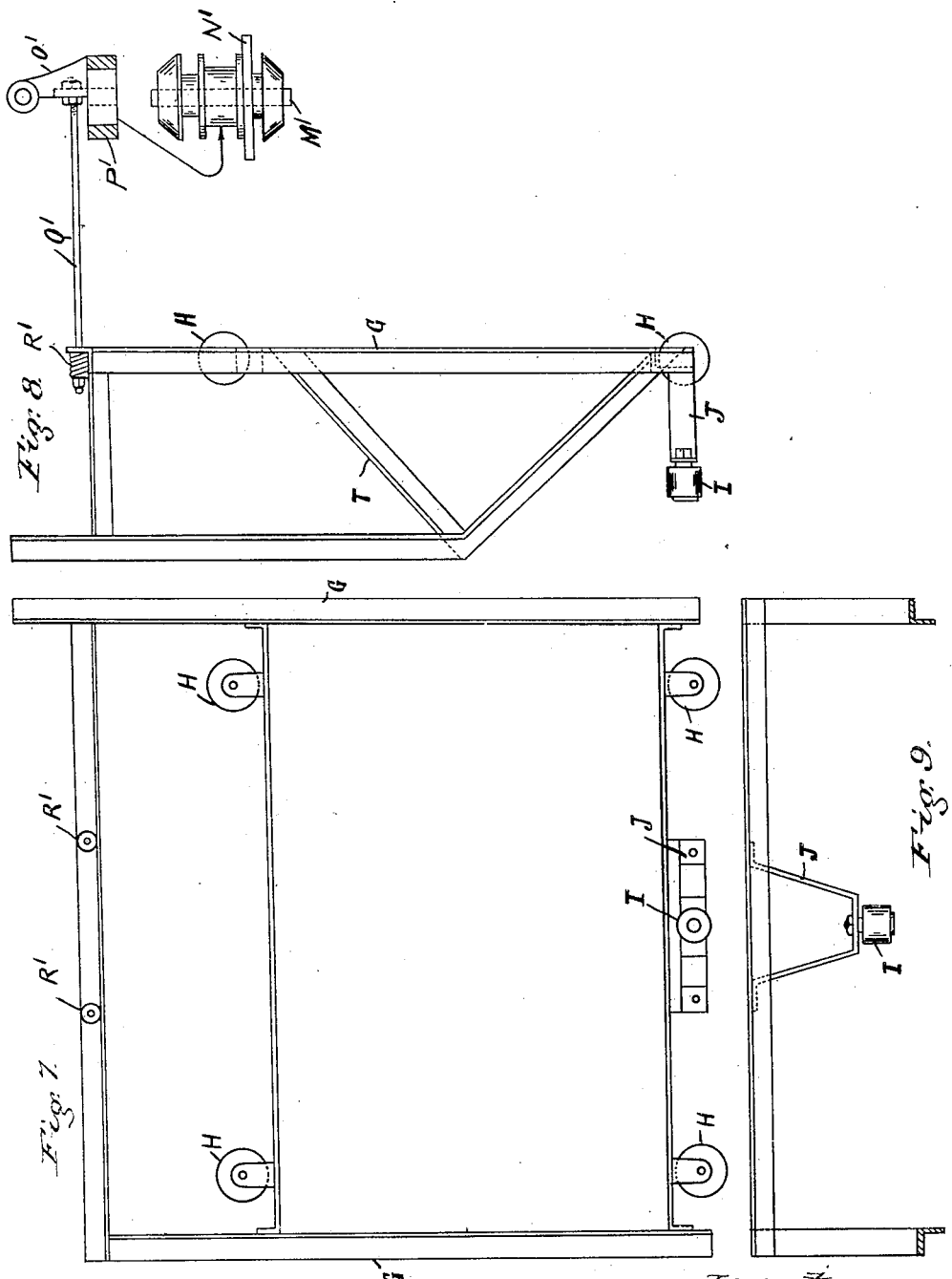

T. J. GEE.
BAND CUTTER AND FEEDER FOR THRESHING MACHINES.
APPLICATION FILED JULY 21, 1920.

1,370,740.
Patented Mar. 8, 1921.
7 SHEETS—SHEET 7.

UNITED STATES PATENT OFFICE.

THOMAS JOHN GEE, OF LEAMINGTON SPA, ENGLAND.

BAND-CUTTER AND FEEDER FOR THRESHING-MACHINES.

1,370,740.      Specification of Letters Patent.      Patented Mar. 8, 1921.

Application filed July 21, 1920. Serial No. 398,007.

*To all whom it may concern:*

Be it known that I, THOMAS JOHN GEE, a subject of the King of the United Kingdom of Great Britain and Ireland, and residing at Leamington Spa, England, have invented a certain new and useful Improvement in Band-Cutters and Feeders for Threshing-Machines, of which the following is a specification.

This invention relates to a threshing machine having an automatic feeder and capable of feeding the machine from the end or from either side and also from the ground level or from the top of the stack, and comprising a feed elevator adapted to work at any point within the range of an arc of approximately 300°, and a bandcutter device including removable bandcutter knives.

The elevator is mounted on a revoluble carriage fitted with grooved rollers tracking two coaxial angle-iron rings forming a runway.

The carriage is fitted with two angle bars arranged to form inclined planes for the purpose of supporting the bearings of the knife shaft, the distance between the knives and the grain carrier being regulated by sliding the bearings of the knife shaft up or down the said angle bars.

Figure 5:
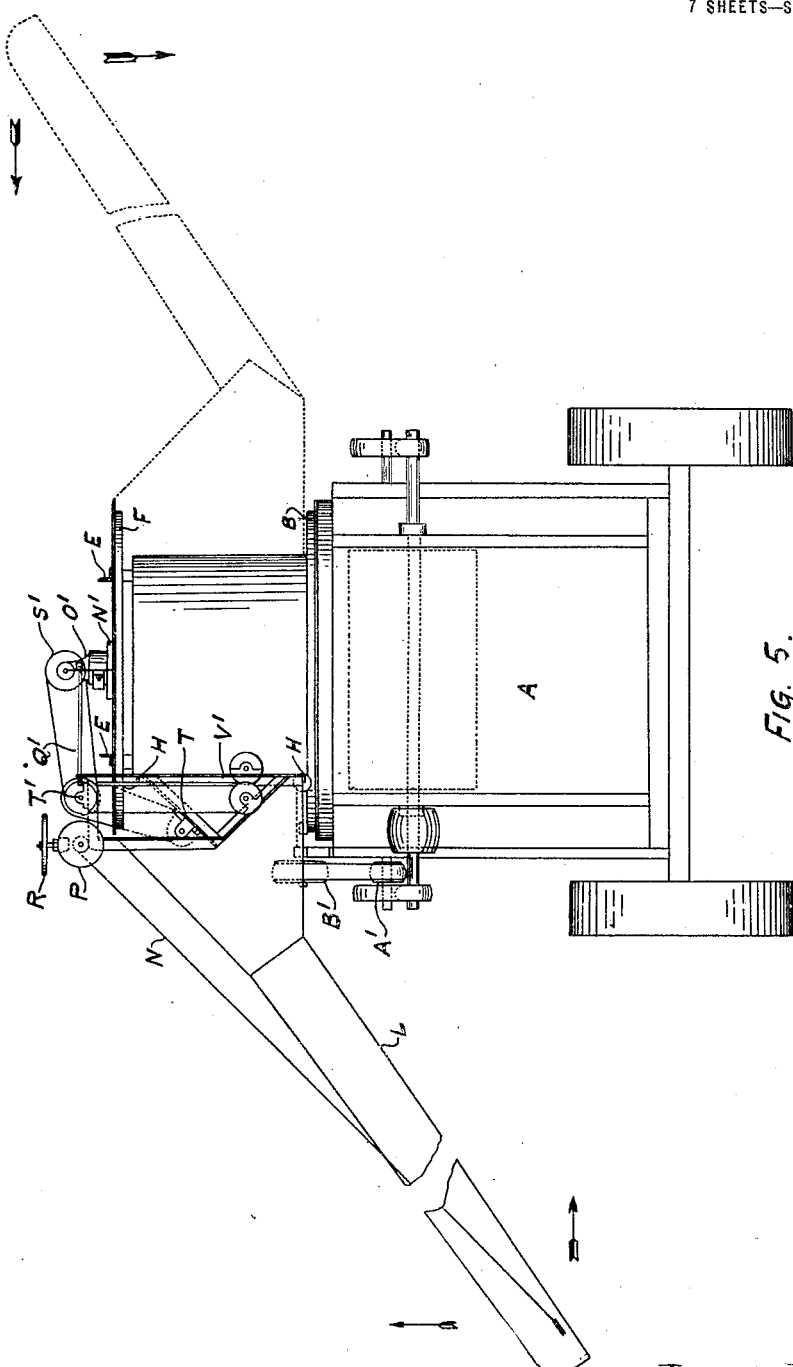
Figure 10:
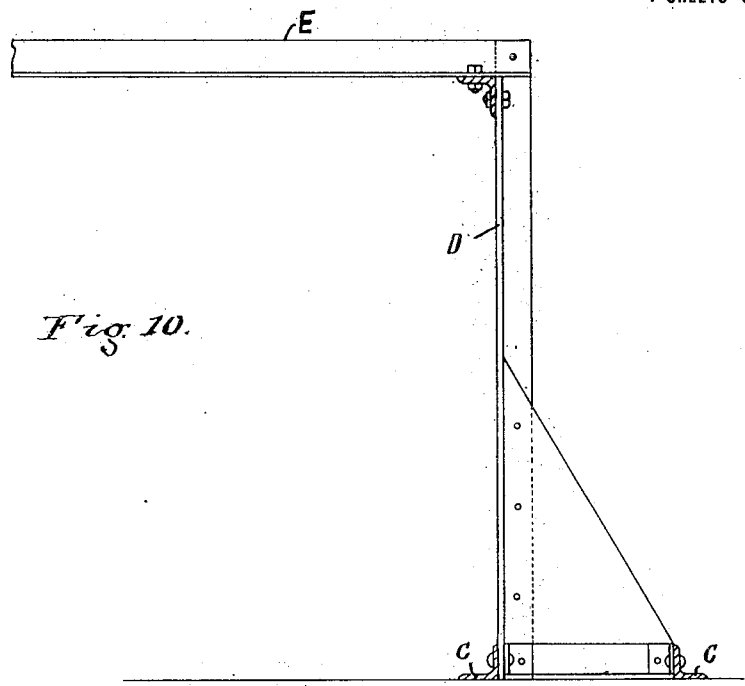
Figure 11:
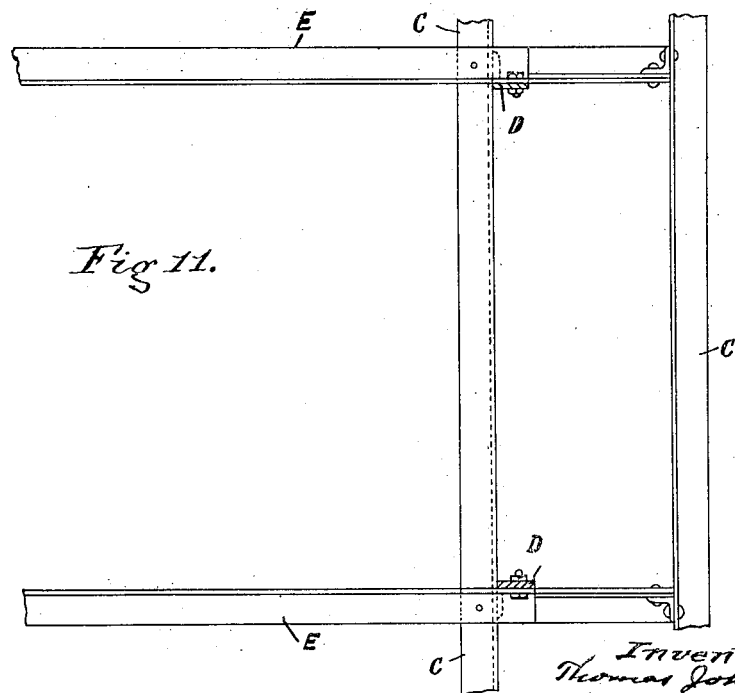

In the accompanying drawings which illustrate the invention Figure 1 is a side elevation of the feeder as fitted to a threshing machine. Fig. 2 is a plan thereof. Fig. 3 is an end elevation of the revolving carriage and part of the runway. Fig. 4 is a sectional elevation on the line X—Y. Fig. 5 shows the general arrangement comprising the feeder applied to a threshing machine. Fig. 6 is a detail view of the feeding mechanism, Figs. 7, 8 and 9 are detail views of some of the frame parts with connected parts, and Figs. 10 and 11 are also detail views of the frame parts.

Referring to the drawings, A denotes the threshing machine to which the feeder and bandcutter are applied. B denotes the lower angle iron ring of the runway. C, C denote two cross angle bars for supporting the framework of the feeder. D, D denote two vertical supports for the driving motion and the upper ring F of the runway. E, E denote two horizontal angle iron supports. G denotes the revolving carriage. H, H denote grooved rollers fitted to the carriage and tracking the runway. I is a roller fitted to the carriage and rotatable around a horizontal axis and resting on the lower runway ring. J is a bracket carrying the roller I. K is a roller fitted to the carriage and rotatable around a vertical axis, said roller running against the inside edge of the upper angle iron F and preventing the carriage from tilting. L is the elevator fitted to the carriage. M is the grain carrier supported on the elevator. N, N denote lifting cables. O is a roller for the cables. P is a large bevel wheel for the winding mechanism. Q is a pinion which operates the bevel wheel P. R denotes a handwheel fitted to the spindle of the pinion Q. S denotes the knife shaft. T, T denote inclined bars fitted to the carriage for carrying the knife shaft bearings. U, U denote shaker feed pans fitted at the entrance to the threshing cylinder. V, V denote suspension links for the shaker feed pans. W, W denote eccentric rods which operate the shaker feed pans. Z, Z denote eccentrics which drive the rods W. A' denotes a pulley on the threshing machine which drives the feeder. B' is a pulley on the feeder driven by the pulley A'. C' denotes a countershaft for the feeder. D' denotes a cross shaft operated by miter gears from the countershaft. E' denotes a wide driving pulley keyed to the cross shaft D'. F' is a fast pulley operated by the pulley E'. G' denotes a loose pulley driven by the pulley E'. H' is the driving belt, which operates either the fast pulley F' or the loose pulley C'. I' is the belt shipper. J', J' are levers which shift the belt. K', K' denote cords fitted to the levers J', J'. L' denotes an upper spindle driven by the pulley F'. M' denotes a vertical spindle which transmits the drive to a swiveling head by means of miter gears. N' is a bracket which forms a bearing for the spindle M'. O' denotes the swiveling head. P' is a cap for the swiveling head. Q', Q' denote tie rods which connect the swiveling head to the carriage. R', R' are the springs which hold the tie rods Q', Q' in place on the carriage. S' is a driving chain to a cross shaft T' on the carriage. U' is a driving chain from the shaft T' to the knife shaft S. V' is a driving chain from the shaft T' to the grain carrier. W' is a spindle fitted with chain wheels for the grain carrier.

The cross angle bars C, C are bolted crosswise on to the threshing machine (parallel to the threshing cylinder) and the vertical supports D, D are provided with triangular steel plates at their bases, as shown, which form the means of bracing the supports D, D to the said cross angle bars C, C.

The cross bars E, E are secured to the vertical supports D, D by means of the angle iron shown, which is fitted at the upper ends of the supports D, D and on the lower edge of the cross bars E, E. The vertical supports D, D are also cut away at the upper ends, and bolted to the cross bars E, E.

The duty of the cross bars is chiefly to support the transmission and guide ring, for the weight of the revolving carriage is supported by the lower guide ring B. The cross bars E, E are furthermore braced together by the two tie rods shown in Fig. 2.

The revolving carriage is built up with light angle irons in the form of a skeleton frame-work. The four guide rollers marked H running on the two rings B and F serve to keep the revolving carriage in its place. The swiveling head O' is fitted with the cap P' and fits between the two collars of the casting N', the head O' being secured to the skeleton framework by means of the tie rods Q', Q', and the springs R', R'.

The roller I is fitted to the bracket J by means of a pin with screw-threaded end, so that the roller is always free to revolve. The purpose of the said roller is to keep the revolving carriage vertical and to prevent the carriage from tilting owing to the weight of the grain elevator box.

The links V, V, from which the trays U, U are suspended, are jointed to suitable brackets X, X, bolted to a flange b on the guide ring B.

To recapitulate:—

The threshing machine A is fitted with the lower angle iron ring B and the cross angle bars C, C and to these latter are fitted the uprights D, D which in turn are fitted with the supporting irons E, E. The upper ring F is suspended from the irons E, E and together with the lower ring B forms a runway for the revolving carriage G. The carriage is fitted with grooved rollers H which run upon the edges of the flanges of the rings B and F, and in order to prevent the carriage from tilting, the carriage is also fitted with the rollers I and K. The grain elevator L and carrier M are fitted on the carriage G and the grain carrier is raised or lowered by the lifting cables N which wind upon the roller O, the latter being operated by the bevel wheel P and the pinion Q operatively connected with the hand-wheel R. The bearings for the knife shaft S are mounted upon the angles T so that by sliding the bearings of the knife shaft up or down the said angles the height of the knives above the grain carrier M can be regulated.

At the entrance to the threshing cylinder the shaker feed pans U are fitted, so that the grain, on being delivered from the elevator, is discharged upon the shaker feed pans and receives an active motion, and is fed in a uniform manner to the threshing cylinder. The shaker pans are suspended from the lower ring B by the links V, and operated by the eccentric rods W driven by the eccentrics Z.

The feeder is driven by the pulley A' which drives on to the pulley B' on the short countershaft C' and this in turn drives the cross shaft D' by means of miter gears. The pulley E' is keyed to the cross shaft D' and drives either the fast pulley F' or the loose pulley G' by means of the driving belt H' which is shifted from one pulley to the other by the shipper I' operated by the levers J' with the cords K', in this manner permitting of the feeder being stopped and started from either side of the machine or from the ground level. The fast pulley F' is keyed to the spindle L' which transmits the driving motion to the swiveling head O', by means of the vertical spindle M' revolving in the bearing N'. This swiveling head O' is made in halves in order to keep it in its correct position on the bracket N' and it is connected to the revolving carriage G by two tie rods Q' fitted with the springs R', so that, on the carriage being turned around, the tie rods Q' turn the head O', but owing to the springs R' and the consequent freedom given to the tie rods Q' no strains are thrown upon the head O'. The drive is transmitted from the head O' to the carriage G by the chain S' and the shaft T' which latter drives the knife shaft b y the chain U' and the grain carrier spindle W' by the chain V'.

I claim:—

1. The combination with a threshing machine, of a feeding attachment comprising a frame-work, a lower guide ring mounted on said frame-work, an upper guide ring suspended from the upper part of said frame-work, said rings affording a runway, a cylindrical rotatable carriage fitted between said rings, and a feed elevator fitted to said carriage.

2. The combination with a threshing machine, of a feeding attachment comprising a frame-work, a lower guide ring mounted on said frame-work, an upper guide ring suspended from the upper part of said frame-work, said rings affording a runway, a cylindrical rotatable carriage fitted between said rings, and a feed elevator fitted to said carriage, said rings being formed with flanges and said carriage being provided with grooved rollers engaging the flanges of said rings.

3. The combination with a threshing machine, of a feeding attachment comprising a frame-work, a lower guide ring mounted on said frame-work, an upper guide ring suspended from the upper part of said frame-work, said rings affording a runway, a cylindrical rotatable carriage fitted between said rings, and a feed elevator fitted to said carriage, said rings being formed with flanges and said carriage being provided with grooved rollers engaging the flanges of said rings and with additional upper and lower rollers, the former bearing against said carriage and the latter bearing against said lower ring, to prevent the carriage from tilting.

4. The combination with a threshing machine, of a feeding attachment mounted thereon and comprising a rotatable carriage, a swiveling driving head mounted on said carriage, and tie rods and springs yieldingly connecting said driving head with said carriage, the yielding connections preventing strain on said head when said carriage is turned, as set forth.

5. The combination with a threshing machine, of a feeding attachment mounted thereon and comprising a carriage which receives the grain, a ring supporting said carriage, shaking feed pans at opposite sides of said ring, brackets attached to said ring, suspending links connecting said brackets with said pans, and means for vibrating said feed pans.

6. The combination with a threshing machine, of a feeding attachment mounted thereon and comprising a carriage which receives the grain, a ring supporting said carriage, shaking feed pans at opposite sides of said ring, brackets attached to said ring, suspending links connecting said brackets with said pans, and means for vibrating said feed pans, said means comprising a rotating shaft provided with eccentrics, and rods connecting said eccentrics with said pans.

In testimony whereof I have signed my name to this specification in the presence of two subscribing witnesses.

THOMAS JOHN GEE.

Witnesses:
FLORENCE HOUSTON,
ISABEL ROLLO.